United States Patent
Greb et al.

(10) Patent No.: US 12,345,326 B2
(45) Date of Patent: Jul. 1, 2025

(54) HYDRAULIC SYSTEM AND METHOD FOR OPERATING A HYDRAULIC SYSTEM

(71) Applicant: Schaeffler Technologies AG & Co. KG, Herzogenaurach (DE)

(72) Inventors: Peter Greb, Ottersweier (DE); Marco Grethel, Bühlertal (DE); Peter Biegert, Gengenbach (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 0 days.

(21) Appl. No.: 18/286,568

(22) PCT Filed: Mar. 25, 2022

(86) PCT No.: PCT/DE2022/100224
§ 371 (c)(1),
(2) Date: Oct. 12, 2023

(87) PCT Pub. No.: WO2022/223069
PCT Pub. Date: Oct. 27, 2022

(65) Prior Publication Data
US 2024/0200580 A1    Jun. 20, 2024

(30) Foreign Application Priority Data
Apr. 21, 2021   (DE) .................. 10 2021 110 042.9

(51) Int. Cl.
*F16H 61/00* (2006.01)
*F15B 11/08* (2006.01)
(Continued)

(52) U.S. Cl.
CPC .......... *F16H 61/0025* (2013.01); *F15B 11/08* (2013.01); *F16H 61/0267* (2013.01);
(Continued)

(58) Field of Classification Search
CPC ............ F15B 11/08; F15B 2211/20561; F16H 61/0025; F16H 2061/0037; F16H 63/38; F16H 61/30; F16H 61/0267
See application file for complete search history.

(56) References Cited

U.S. PATENT DOCUMENTS

| | | | |
|---|---|---|---|
| 6,256,987 B1 * | 7/2001 | Stolle ................... | B60J 7/1273 60/484 |
| 10,253,770 B2 * | 4/2019 | Lundstrom ............ | F04B 1/182 |

(Continued)

FOREIGN PATENT DOCUMENTS

| | | | |
|---|---|---|---|
| DE | 102018112670 A1 | 11/2019 | |
| DE | 102021124487 B3 * | 12/2022 | ......... F16H 61/0025 |

(Continued)

*Primary Examiner* — Michael Leslie
(74) *Attorney, Agent, or Firm* — Matthew V. Evans

(57) ABSTRACT

The disclosure relates to a hydraulic system including a reversing pump which has two delivery connections via which a hydraulic medium can be delivered from a tank in opposite delivery directions in order to hydraulically actuate an actuating element and supply a cooling and/or lubricating system. The hydraulic system also includes a valve assembly via which an actuating piston in a double-acting actuating cylinder can be supplied with hydraulic medium.
A first delivery connection of the reversing pump is fluidly connected to a first pressure connection of the double-acting actuating cylinder. A second delivery connection of the reversing pump is fluidly connected to a second pressure connection of the double-acting actuating cylinder. The actuating piston is mechanically coupled to a valve piston of a valve, and the valve piston is mechanically coupled to a locking device and to the actuating element.

17 Claims, 1 Drawing Sheet

(51) Int. Cl.
*F16H 61/02* (2006.01)
*F16H 61/30* (2006.01)
*F16H 63/38* (2006.01)

(52) U.S. Cl.
CPC ..... *F16H 61/30* (2013.01); *F16H 2061/0037* (2013.01); *F16H 63/38* (2013.01)

(56) References Cited

U.S. PATENT DOCUMENTS

| | | |
|---|---|---|
| 10,703,184 B2 | 7/2020 | Nilsson |
| 2017/0291481 A1 | 10/2017 | Nilsson |
| 2024/0125383 A1* | 4/2024 | Greb ................... F16H 61/0009 |

FOREIGN PATENT DOCUMENTS

| | | | | |
|---|---|---|---|---|
| DE | 102021124454 A1 * | 3/2023 | ......... | F16H 57/0441 |
| DE | 102021126995 B3 * | 3/2023 | ......... | F16H 61/0025 |
| DE | 102021129073 A1 * | 5/2023 | ............. | F15B 11/08 |
| WO | 2015114125 A2 | 8/2015 | | |
| WO | 2019219174 A1 | 11/2019 | | |

* cited by examiner

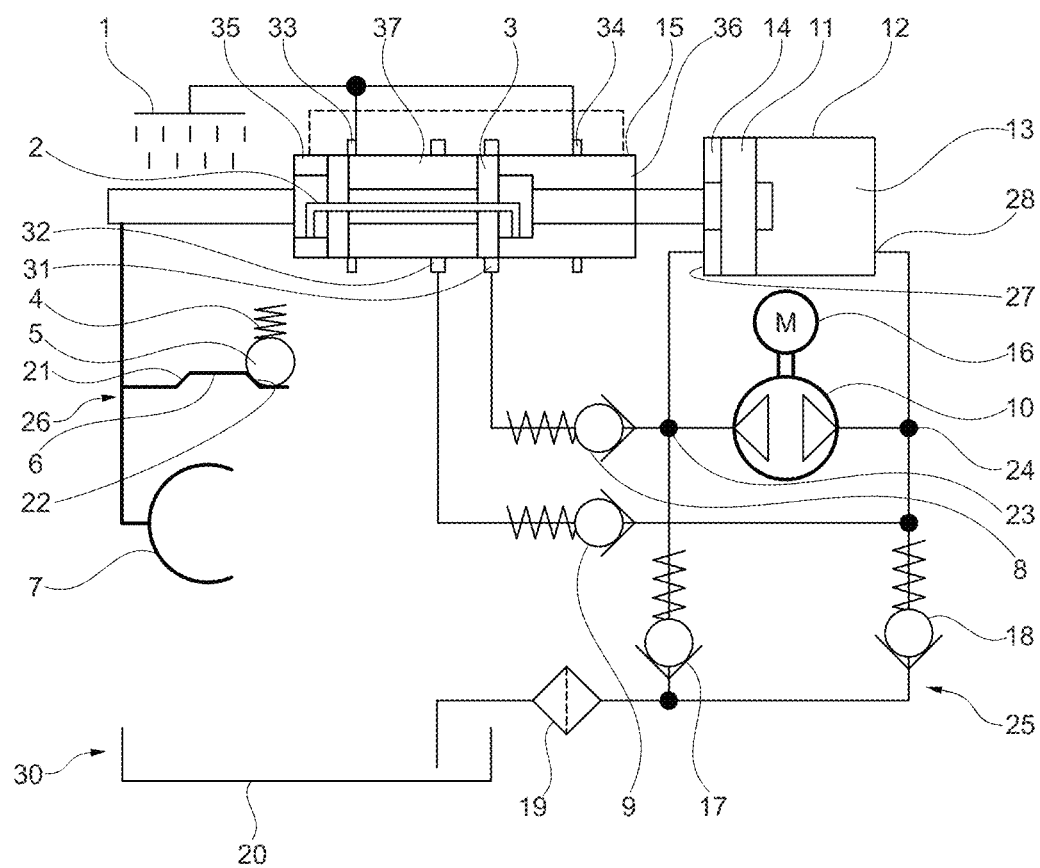

HYDRAULIC SYSTEM AND METHOD FOR OPERATING A HYDRAULIC SYSTEM

CROSS-REFERENCE TO RELATED APPLICATIONS

This application is the U.S. National Phase of PCT Application No. PCT/DE2022/100224 filed on Mar. 25, 2022, which claims priority to DE 10 2021 110 042.9 filed on Apr. 21, 2021, the entire disclosures of which are incorporated by reference herein.

TECHNICAL FIELD

The disclosure relates to a hydraulic system and to a method for operating a hydraulic system.

BACKGROUND

A hydraulic device with a pump is known from the German patent application DE 10 2018 112 670 A1, which describes a device that can be connected to a coolant line for supplying a first consumer with hydraulic medium for cooling and/or lubricating it, and to an actuation line for supplying a second consumer. The device can be connected to the same hydraulic means to actuate it. The pump is designed as a reversing pump, and a hydraulic parking lock actuator, which has a double-acting piston, can be supplied with hydraulic means for actuating the parking lock. The piston is designed as a differential area piston, and the parking lock actuator is able to be fixed in position via a locking device, and the locking device has a spring-pretensioned blocking element, which is dimensioned and arranged for engagement in a shape-contrasting recess.

SUMMARY

The object of the disclosure is to reduce the costs for producing a hydraulic system comprising a reversing pump. The hydraulic system can have two delivery connections via which a hydraulic medium can be delivered from a tank in opposite delivery directions in order to hydraulically actuate an actuating element and in order to supply a cooling and/or lubricating system with hydraulic medium. In addition, the hydraulic system can include a valve assembly via which an actuating piston in a double-acting actuating cylinder can be supplied with hydraulic medium, and the actuating piston is mechanically coupled to a locking device and to the actuating element.

The object is achieved by a hydraulic system that includes a reversing pump which has two delivery connections, via which a hydraulic medium can be delivered from a tank in opposite delivery directions in order to hydraulically actuate an actuating element and in order to supply a cooling and/or lubricating system with hydraulic medium. The hydraulic system also includes a valve assembly, via which an actuating piston in a double-acting actuating cylinder can be supplied with hydraulic medium. The actuating piston is mechanically coupled to a locking device and to the actuating element. A first delivery connection of the reversing pump is fluidly connected to a first tank non-return valve that blocks in the direction of the tank and to a first pressure connection of the double-acting actuating cylinder. A second delivery connection of the reversing pump is fluidly connected to a second tank non-return valve that blocks in the direction of the tank and to a second pressure connection of the double-acting actuating cylinder. The actuating piston is mechanically coupled to a valve piston of a valve and the valve piston is in turn mechanically coupled to the actuating element. The actuating element is used, for example, to actuate a parking lock, a dog clutch or the like. In comparison to conventional hydraulic systems, no active valve is required.

In an exemplary embodiment of the hydraulic system, the valve has two inlets, which are fluidly connected to the delivery connections of the reversing pump via cooling non-return valves which block the inlets. Depending on the pumping direction, the reversing pump can move the valve piston in one direction or the other in order to actuate the actuating element in one direction or the other.

In an exemplary embodiment of the hydraulic system, the valve has two outlets which are fluidly connected to the cooling and/or lubrication system. The cooling and/or lubrication system can be sufficiently supplied with hydraulic medium via the two outlets. Advantageously, only one of the two outlets is open for cooling and/or lubrication. In addition, the inlets and outlets of the valve are advantageously arranged in such a way that the supply of hydraulic medium to the cooling and/or lubrication system causes no or no great loss of pressure in the hydraulic system.

In an exemplary embodiment of the hydraulic system, the valve piston in the valve delimits two outer valve chambers which are hydraulically or fluidly connected to one another. In this way, a pressure equalization between the two outer valve chambers can be realized in a simple manner. The hydraulic connection can be realized internally, for example if the hydraulic connection runs through the valve piston itself. However, the hydraulic connection can also be implemented by an external connection line on the valve.

In an exemplary embodiment of the hydraulic system, the valve piston in the valve delimits an inner valve chamber which is arranged axially between the outer valve chambers. The term axial refers to the axis of motion of the valve piston. Axial means in the direction of, or parallel to, the axis of motion of the valve piston. The two inlets of the valve are advantageously arranged centrally or in the middle on the valve. The two inlets are advantageously axially spaced from each other.

In an exemplary embodiment of the hydraulic system, the valve piston is mechanically coupled to a locking cam that includes two cam ramps which interact with a locking element of the locking device which is preloaded by a spring device. A movement of the valve piston is initiated by the reversing pump via the actuating piston. As soon as the valve piston reaches one of its two end positions, the locking device influences the movement of the valve piston via the interaction of the cam ramps with the locking element of the locking device.

In an exemplary embodiment of the hydraulic system, the cam ramps are provided at the ends of a plateau. As long as the locking element is in contact with the plateau of the locking cam, the locking device exerts little or no influence on the movement of the valve piston. The cam ramps slope downwards at opposite ends of the plateau. Together with the preload force of the spring device, potential energy is stored in the spring device or released by the spring device, depending on the direction of movement.

The disclosure also relates to a valve, in particular a valve piston, a locking device, in particular a locking element or a locking cam, an actuating piston, an actuating cylinder, a reversing pump and/or a non-return valve for a hydraulic system as described above. The parts mentioned can be marketed separately.

In a method for operating a hydraulic system as described above, the above-mentioned object is alternatively or additionally achieved in that the actuating element is actuated by the reversing pump via the actuating piston and the valve piston in a first direction or in a second direction. The actuating piston unblocks only one of the outlets of the valve at respective end positions. In this way it is achieved in a simple manner that sufficient, but not too much, hydraulic medium reaches the cooling and/or lubrication system.

In an exemplary embodiment of the method, the locking element is moved at the beginning of an actuation by one of the cam ramps in order to store potential energy in the preloaded spring device, which is released again at the end of the actuation via the locking element. This ensures that the valve piston or the actuating piston also reaches its end position safely when hydraulic displacement is no longer possible due to the open outlet on the valve for cooling and/or lubrication.

Further advantages, features and details of the disclosure are apparent from the following description.

BRIEF DESCRIPTION OF THE DRAWINGS

The sole accompanying FIGURE shows a hydraulic system with a reversing pump, a valve assembly and with a double-acting actuating cylinder comprising an actuating piston mechanically coupled to a valve piston of a valve, which in turn is mechanically coupled to a locking device and an actuating element.

DETAILED DESCRIPTION

In FIG. 1, a hydraulic system 30 with a reversing pump 10 is shown in the form of a hydraulic circuit diagram. The reversing pump 10 can deliver hydraulic medium from a tank 20 via a suction filter 19 in opposite directions, as indicated by arrow symbols in a pump symbol of the reversing pump 10. The reversing pump 10 is driven by a pump motor 16. The pump motor 16 is, for example, an electric motor.

A first delivery connection 23 is indicated to the left of the reversing pump 10 in FIG. 1. A second delivery connection 24 is indicated to the right of the reversing pump 10 in FIG. 1. The first delivery connection 23 can be fluidly connected to the tank 20 via a first tank non-return valve 17. The second delivery connection 24 can be fluidly connected to the tank 20 via a second tank non-return valve 18.

The two tank non-return valves 17 and 18 block in the direction of tank 20. An actuating cylinder 12 is arranged above the pump motor 16 of the reversing pump 10 in FIG. 1. The actuating cylinder 12 is designed as a double-acting cylinder with an actuating piston 11.

The actuating piston 11 divides the actuating cylinder 12 into pressure chambers 13 and 14. One pressure chamber 14 is fluidly connected to the first delivery connection 23 of the reversing pump 10 via a first pressure connection 27. The other pressure chamber 13 is fluidly connected to the second delivery connection 24 of the reversing pump 10 via a second pressure connection 28.

In addition to the tank non-return valves 17 and 18, a valve assembly 25 comprises a first cooling non-return valve 8 and a second cooling non-return valve 9. The first cooling non-return valve 8 is fluidly connected between the first delivery connection 23 of the reversing pump 10 and a first inlet 31 of a valve 15. The second cooling non-return valve 9 is fluidly connected between the second delivery connection 24 of the reversing pump 10 and a second inlet 32 of the valve 15. The inlets 31 and 32 are provided at the bottom of the valve 15 in FIG. 1.

Two outlets 33 and 34 are provided on the valve 15 at the top of FIG. 1. The outlets 33 and 34 of the valve 15 are fluidly connected to a cooling and/or lubrication system 1.

In the valve 15 in FIG. 1, a valve piston 3 is guided back and forth to the left and to the right. The valve piston 3 of the valve 15 is mechanically coupled to the actuating piston 11 of the double-acting actuating cylinder 12. The mechanical coupling takes place, for example, by means of a piston rod, which is not specified in any more detail. The valve piston 3 is mechanically coupled to an actuating element 7 and to a locking device 26 via a further piston rod, which is not designated in any more detail.

The valve piston 3 comprises two valve piston bodies, via which an interior of the valve 15 is divided into two outer valve chambers 35 and 36 and an inner valve chamber 37.

The two inlets 31 and 32 are provided centrally at the bottom of the valve 15 in the axial direction. The two inlets 31 and 32 are axially spaced from each other. The two outlets 33 and 34 are arranged in FIG. 1 at the top of the valve 15 further towards the outside than the inlets 31 and 32, that is, offset laterally to the left and to the right in relation to them.

The two outer valve chambers 35 and 36 of the valve 15 are fluidly connected to one another via a connection line 2. The connection line 2 extends through the valve piston 3. A dotted line above the valve 15 indicates that the outer valve chambers 35 and 36 can also be fluidly connected to one another by an external connection line.

In FIG. 1, the valve piston 3, like the actuating piston 11, is in its end position on the left in FIG. 1. In this end position of the valve piston 3, the inlet 32 of the valve 15 is fluidly connected to the outlet 33 via the inner valve chamber 37. Thus, the cooling and/or lubrication system 1 is supplied with hydraulic medium via the inlet 32 and the outlet 33 of the valve 15.

The inlet 31 is closed off by the valve piston 3. The outer valve chamber 35 is also fluidly connected to the cooling and/or lubrication system 1 via the outlet 34, but no hydraulic medium flows through the outlet 34 when the valve piston 3 is in the illustrated end position.

The locking device 26 comprises a cam ramp 21 which is mechanically coupled to the valve piston 3. The cam ramp 21 comprises a plateau on its upper side in FIG. 1, from the ends of which two cam ramps 21 and 22 emanate. The cam ramps 21 and 22 slope downwards from the plateau to the left and to the right in FIG. 1. The locking cam 6 interacts with a locking element 5. The locking element 5 is designed as a ball and is preloaded downwards against the locking cam 6 by a spring device 4 in FIG. 1.

In the state of the hydraulic system 30 shown in FIG. 1, the locking element 5 rests against the cam ramp 22 of the locking cam 6 on the right in FIG. 1. If the reversing pump 10 is switched in the state shown in FIG. 1 so that it delivers to the right, i.e., from the delivery connection 23 to the delivery connection 24, then hydraulic medium is sucked out of the tank 20 via the tank non-return valve 17 on the left in FIG. 1. At the same time, hydraulic medium is delivered via the inlet 32 into the valve 15 via the lower cooling non-return valve 9 in FIG. 1.

Since only the outlet 33 is open in the valve 15 due to the position of the valve piston, hydraulic medium for cooling and/or lubrication 1 is delivered via this outlet. The right-hand pressure chamber 13 of the actuating cylinder 12, which is also pressurized, holds the actuating piston 11 and the valve piston 3 in its left-hand stop position or end position shown in FIG. 1.

If the reversing pump 10 is switched so that it delivers to the left in FIG. 1, i.e., from the delivery connection 24 to the delivery connection 23, hydraulic medium is sucked out of the tank 20 via the tank non-return valve 18 on the right in FIG. 1 and delivered into the pressure chamber 14 of the actuating cylinder 12 on the left in FIG. 1. Since the right-hand inlet 31 of the valve 15 is closed via the valve piston 3, hydraulic pressure can be built up in the pressure chamber 14 of the actuating cylinder 12, via which the actuating piston 11 is moved to the right.

Due to the mechanical coupling of the actuating piston 11 and the valve piston 3, the valve piston 3 is also moved to the right and first closes the outlet 33 for cooling and/or lubrication 1 before the valve piston 3 releases the inlet 31 of the valve 15, shown on the right in FIG. 1. As a result, the actuating pressure in the pressure chamber 14 for displacing the actuating piston 11 is maintained throughout the entire actuating process, so that the actuating piston 11 is moved almost to the stop to the right in FIG. 1.

At the beginning of the actuation, the locking element 5 is displaced against the force of the spring device 4 via the locking cam 6 displaced via the actuating element 7, wherein the spring device 4 is loaded with mechanical energy. Towards the end of the actuation process, the valve piston 3 first closes the valve inlet 32 on the left in FIG. 1 and then the valve outlet 34 on the right in FIG. 1 is released. Since this causes a drop in the hydraulic pressure for a further displacement of the actuating piston 11 up to the stop, the actuating piston 11 can no longer be hydraulically displaced.

In this state, however, the locking element 5, which has been subjected to the preload force of the spring device 4, is already on the descending cam ramp 21 on the left in FIG. 1, via which the switching element or actuating element 7 and the pistons 3 and 11 fluidly connected thereto can be moved further to the right using the stored energy of the spring device 4. The reverse switching actuation of the actuating element 7 takes place analogously.

LIST OF REFERENCE SYMBOLS

1 Cooling and/or lubrication system
2 Connection line
3 Valve piston
4 Spring device
5 Locking element
6 Locking cam
7 Actuating element
8 First cooling non-return valve
9 Second cooling non-return valve
10 Reversing pump
11 Actuating piston
12 Actuating cylinder
13 Pressure chamber
14 Pressure chamber
15 Valve
16 Pump motor
17 First tank non-return valve
18 Second tank non-return valve
19 Suction filter
20 Tank
21 Cam ramp
22 Cam ramp
23 First delivery connection
24 Second delivery connection
25 Valve assembly
26 Locking device
27 First pressure connection
28 Second pressure connection
30 Hydraulic system
31 Inlet
32 Inlet
33 Outlet
34 Outlet
35 Outer valve chamber
36 Outer valve chamber
37 Inner valve chamber

The invention claimed is:

1. A hydraulic system comprising:
a reversing pump having two delivery connections via which a hydraulic medium is delivered from a tank in opposite delivery directions of the reversing pump to hydraulically actuate an actuating element so as to supply at least one of a cooling system or lubricating system with hydraulic medium, and
a valve assembly having an actuating piston arranged in a double-acting actuating cylinder, the valve assembly configured to be supplied with hydraulic medium, and the actuating piston mechanically coupled to a locking device and to the actuating element, and
a first delivery connection of the reversing pump is fluidly connected to: i) a first tank non-return valve configured to block in a direction of the tank, and ii) to a first pressure connection of the double-acting actuating cylinder, and
a second delivery connection of the reversing pump is fluidly connected to: i) a second tank non-return valve configured to block in the direction of the tank, and ii) to a second pressure connection of the double-acting actuating cylinder, and
the actuating piston is mechanically coupled to a valve piston of a valve, and the valve piston: i) delimits two outer valve chambers which are fluidly connected to each other, and ii) is mechanically coupled to the actuating element.

2. The hydraulic system according to claim 1, wherein the valve has two inlets fluidly connected to the first and second delivery connections of the reversing pump via cooling non-return valves configured to block the two inlets.

3. The hydraulic system according to claim 1, wherein the valve has two outlets fluidly connected to the at least one of the cooling system or lubrication system.

4. The hydraulic system according to claim 3, wherein the valve piston is mechanically coupled to a locking cam having two cam ramps configured to interact with a locking element of the locking device, the locking element preloaded by a spring device.

5. A method for operating the hydraulic system according to claim 4, the method comprising:
actuating the actuating element in one of a first direction or a second direction by the reversing pump via the actuating piston and the valve piston, wherein the actuating piston unblocks only one of the two outlets of the valve at respective end positions of the actuating piston.

6. The method according to claim 5, wherein the locking element is moved at a beginning of an actuation by one of the cam ramps to store potential energy in the spring device, and the stored potential energy is released at an end of the actuation via the locking element.

7. The hydraulic system according to claim 4, wherein the two cam ramps are arranged at ends of a plateau.

8. The hydraulic system according to claim 1, wherein the valve piston of the valve delimits an inner valve chamber arranged axially between the two outer valve chambers.

9. A hydraulic system comprising:
a reversing pump having two delivery connections via which a hydraulic medium is delivered from a tank in opposite delivery directions of the reversing pump to hydraulically actuate an actuating element so as to supply at least one of a cooling system or lubricating system with hydraulic medium, and
a valve assembly having:
an actuating piston arranged in a double-acting actuating cylinder, the valve assembly configured to be supplied with hydraulic medium, and the actuating piston mechanically coupled to a locking device and to the actuating element, and
a valve comprising:
a valve piston mechanically coupled to the actuating piston and the actuating element,
a first inlet and a second inlet, and
two outlets fluidly connected to the at least one of the cooling system or lubrication system, and
a first delivery connection of the reversing pump is fluidly connected to: i) a first pressure chamber defined by the actuating piston and the double-acting actuating cylinder, and ii) the first inlet, and
a second delivery connection of the reversing pump is fluidly connected to: i) a second pressure chamber defined by the actuating piston and the actuating piston, and ii) the second inlet and
wherein an interior of the valve is divided into two outer valve chambers and an inner valve chamber via the valve piston, and the two outer valve chambers are fluidly connected to each other.

10. The hydraulic system according to claim 9, wherein:
when the actuating piston is in a first position, one of the two outlets of the valve is blocked via the valve piston, and
when the actuating piston is in a second position, a remaining one of the two outlets of the valve is blocked via the valve piston.

11. The hydraulic system according to claim 9, wherein:
when the actuating piston is in a first position, one of the two outlets of the valve is blocked via the valve piston, and a remaining one of the two outlets of the valve is open, and
when the actuating piston is in a second position, the remaining one of the two outlets of the valve is blocked via the valve piston, and the one of the two outlets of the valve is open.

12. The hydraulic system according to claim 11, wherein the first and second inlets are arranged between the two outlets in an axial direction.

13. The hydraulic system according to claim 9, wherein the valve piston comprises two valve piston bodies and the inner valve chamber is formed between the two valve piston bodies in an axial direction.

14. The hydraulic system according to claim 9, wherein the locking device includes a locking cam having cam ramps.

15. The hydraulic system according to claim 14, wherein the locking device is preloaded by a spring device.

16. The hydraulic system according to claim 9, further comprising:
a first non-return valve arranged between the first delivery connection and the valve, and
a second non-return valve arranged between the second delivery connection and the valve.

17. A hydraulic system comprising:
a reversing pump having two delivery connections via which a hydraulic medium is delivered from a tank in opposite delivery directions of the reversing pump to hydraulically actuate an actuating element so as to supply at least one of a cooling system or lubricating system with hydraulic medium, and
a valve assembly having an actuating piston arranged in a double-acting actuating cylinder so as to divide the double-acting actuating cylinder into a first pressure chamber and a second pressure chamber, the valve assembly configured to be supplied with hydraulic medium, and the actuating piston mechanically coupled to a locking device and to the actuating element, and
a first delivery connection of the reversing pump is fluidly connected to: i) a first tank non-return valve configured to block in a direction of the tank, and ii) to the first pressure chamber of the double-acting actuating cylinder, and
a second delivery connection of the reversing pump is fluidly connected to: i) a second tank non-return valve configured to block in the direction of the tank, and ii) to the second pressure chamber of the double-acting actuating cylinder, and
the actuating piston is mechanically coupled to a valve piston of a valve, and the valve piston: i) delimits two outer valve chambers, and ii) is mechanically coupled to the actuating element, and
wherein the two outer valve chambers are fluidly connected to the at least one of the cooling system or the lubricating system.

* * * * *